(12) United States Patent
Sang et al.

(10) Patent No.: US 12,360,220 B2
(45) Date of Patent: Jul. 15, 2025

(54) LiDAR AND METHOD OF FAST PHOTON-COUNT INTEGRATION FOR LiDAR

(71) Applicant: National Yang Ming Chiao Tung University, Hsinchu (TW)

(72) Inventors: Tzu-Hsien Sang, Hsinchu (TW); Chia-Ming Tsai, Hsinchu (TW); Yung-Chien Liu, Hsinchu (TW); Ningkai Yang, Hsinchu (TW); Ting-Yuan Wang, Hsinchu (TW)

(73) Assignee: National Yang Ming Chiao Tung University, Hsinchu (TW)

( * ) Notice: Subject to any disclaimer, the term of this patent is extended or adjusted under 35 U.S.C. 154(b) by 910 days.

(21) Appl. No.: 17/529,783

(22) Filed: Nov. 18, 2021

(65) Prior Publication Data

US 2022/0163643 A1    May 26, 2022

(30) Foreign Application Priority Data

Nov. 23, 2020  (TW) ................................ 109141010

(51) Int. Cl.
*G01S 7/4865* (2020.01)
*G01S 7/4861* (2020.01)
*G04F 10/00* (2006.01)

(52) U.S. Cl.
CPC .......... *G01S 7/4865* (2013.01); *G01S 7/4861* (2013.01); *G04F 10/005* (2013.01)

(58) Field of Classification Search
CPC ...... G01S 7/4865; G01S 7/4861; G01S 17/10; G01S 7/487; G04F 10/005
See application file for complete search history.

(56) References Cited

U.S. PATENT DOCUMENTS 10,509,112 B1 * 12/2019 Pan ......................... G01S 7/484
2021/0372923 A1 * 12/2021 Son ........................ G01S 17/931

OTHER PUBLICATIONS

Sang et al. "A Method for Fast Acquisition of Photon Counts for SPAD LiDAR" (Year: 2021).*

* cited by examiner

*Primary Examiner* — Assres H Woldemaryam
(74) *Attorney, Agent, or Firm* — HEA LAW PLLC; Darrin A. Auito

(57) ABSTRACT

A LiDAR and a method of a fast photon-count integration for a LiDAR are disclosed. The proposed method, wherein the LiDAR includes a laser, includes: providing a target and the LiDAR; causing the laser to fire a laser pulse towards the target according to a random mechanism; and causing an interval between two adjacent laser pulses to be less than a time that the laser spent for a round trip of maximum unambiguous range to speed up a detection and a ranging of the target.

9 Claims, 6 Drawing Sheets

LiDAR AND METHOD OF FAST PHOTON-COUNT INTEGRATION FOR LiDAR

CROSS-REFERENCE TO RELATED APPLICATIONS

The application claims the benefit of Taiwan Patent Application No. 109141010, filed on Nov. 23, 2020, at the Taiwan Intellectual Property Office, the disclosures of which are incorporated herein in their entirety by reference.

TECHNICAL FIELD

The present disclosure is related to a LiDAR and a method of a fast photon-count integration for a LiDAR. Particularly, the present disclosure is related to a LiDAR using a Multi-Start Multi-Stop (MSMS) integration method to quickly form a photon-count histogram and a method of a fast photon-count integration for a LiDAR.

BACKGROUND

LiDAR is an important target detection technology and an important ranging technology. Sensors required by remote sensing and autopilot are its main application fields. The conventional LiDAR technologies will emit multiple laser pulses towards the target and accumulate the received reflected signals, and how quickly a LiDAR can accomplish a target detection is an important performance index.

LiDAR emits laser, and then detects the laser reflected by the object to detect the target and to range. The common ranging method is to measure a time of flight (ToF) of a reflected laser beam to calculate a distance. To increase a sensitivity of LiDAR to detect a reflected light, it has gradually become a trend to use a single-photon avalanche diode (SPAD) as a sensing element of LiDAR. After the detected photons within an acquisition time are cumulated to become a histogram, a target detection and a ranging can be further engaged in. Thus, to cumulate enough photons within a very short period of time to form a reliable histogram is a critical point on whether a distance can be detected quickly. The conventional LiDAR continuously emits laser pulses having a fixed interval to the target, and to avoid the ambiguity of ranging, it is usually set up that a speed of light times the interval of pulses has to be larger than twice of a maximum value of ranging specification of LiDAR. This setting will limit the number of laser pulses emitted within a unit time, it will then limit the detected photons cumulated within the unit time, and thus under certain circumstances, the fast ranging cannot be realized.

Thus, how to improve existing LiDARs and methods of photon integration to cause a significantly speed-up of the integration time of an accumulation of enough received photons so as to achieve the purpose of fast target detection and ranging is worthy of further research and improvement.

Keeping the drawbacks of the prior art in mind, and through the use of robust and persistent experiments and research, the applicant has finally conceived of a LiDAR and a method of fast photon-count integration for a LiDAR.

SUMMARY

It is an objective of the present invention to provide a LiDAR and a method of fast photon-count integration for LiDAR to significantly speed up a speed of accumulating enough received photons and decrease the time of accumulating enough received photons so as to achieve the purpose of fast target detection and ranging.

In accordance with the first aspect of the present invention, a method of a fast photon-count integration for a LiDAR, wherein the LiDAR includes a laser, a photon detector, a time-to-digital converter, a histogram generator and a random pulse generator, comprises: providing a target and the LiDAR; causing the random pulse generator to generate a plurality of random triggering signals according to a random mechanism included therein so as to cause the laser to generate a plurality of random laser pulses accordingly, wherein each random laser pulse corresponds to a start point; receiving a plurality of photons by the photon detector to generate a plurality of photon detection events, wherein at least a portion of the plurality of photons is generated from reflecting the plurality of random laser pulses by the target; using the time-to-digital converter to calibrate a time of each photon detection event, wherein each photon detection event corresponds to an end point; defining a plurality of unit times covered by the plurality of photon detection events so that each end point is in a specific one of the plurality of unit times; and causing the histogram generator to use a Multi-Start Multi-Stop (MSMS) integration method to sequentially record in reverse order each time difference between a respective end point and a respective start point located in the specific unit time corresponding to the respective end point so as to generate a photon-count histogram according to all the time differences for all the end points, and to obtain a detection and a ranging of the target according to a peak value of the photon-count histogram.

In accordance with the second aspect of the present disclosure, a method of a fast photon-count integration for a LiDAR, wherein the LiDAR includes a laser, comprises: providing a target and the laser; causing the laser to emit a plurality of laser pulses towards the target according to a random mechanism; and causing an interval between two adjacent laser pulses to be less than a time that the laser spent for a round trip of a maximum unambiguous range such that the LiDAR will speed up a detection and a ranging towards the target.

In accordance with the third aspect of the present disclosure, a LiDAR comprises a random pulse generator generating a plurality of random triggering signals according to a random mechanism included therein, a laser receiving the plurality of random triggering signals so as to generate a plurality of laser pulses accordingly, wherein each random laser pulse corresponds to a start point, a photon detector receiving a plurality of photons to generate a plurality of photon detection events, wherein at least a portion of the plurality of photons is generated from reflecting the plurality of laser pulses by an external target, a time-to-digital converter coupled to the photon detector and used to calibrate a time of each photon detection event, wherein each photon detection event corresponds to an end point, and a histogram generator coupled to the time-to-digital converter, defining a plurality of unit times covering the plurality of photon detection events so that each end point corresponds to a specific one of the plurality of unit times, using a Multi-Start Multi-Stop (MSMS) integration method, to sequentially record in reverse order all time differences between each end point and each of start points located in the specific unit time corresponding to the end point, and generating a photon-count histogram according to the all time differences for all the end points such that the LiDAR accomplishes a detection and a ranging towards the target accordingly.

BRIEF DESCRIPTION OF THE DRAWINGS

Other objectives, advantages and efficacies of the present disclosure will be described in detail below taken from the preferred embodiments with reference to the accompanying drawings.

DETAILED DESCRIPTION

The present disclosure mainly has three technical sub-items: 1. LiDAR densely emits abundant laser pulses, an interval of each laser pulse can be much less than a minimum interval set up by an ordinary LiDAR to avoid an ambiguity of ranging. 2. The emission times of these laser pulses can be decided by a true random (B-2) mechanism or a pseudo random (B-1) mechanism. 3. Photon detection events received by the SPAD can quickly form the photon-count histogram by the MSMS integration method after the receiving times of the photon detection events are calibrated. After the histogram is generated using these three technologies, various algorithms handling the histogram can be implemented continuously to engage in the detection and ranging. A preferred embodiment of the laser emission mechanism can be performed by a stochastic pulse position modulation (SPPM) method. If the densities of the laser triggering signals are adjusted, then densely emitting the laser pulses in the unit time can be accomplished, and the time and location of each laser pulse are decided randomly.

The receiving terminal of the LiDAR mainly includes a photon detector, a time-to-digital convertor (TDC), a histogram generator, and the various subsequent handling algorithms. The preferred embodiment can use the SPAD as the photon detector to obtain the best sensitivity, and the TDC is used to calibrate the receiving times of the photon detection events. The present disclosure proposes to use the MSMS integration method as the method to generate the photon-count histogram, which is described in detail as follows.

Figure 1:
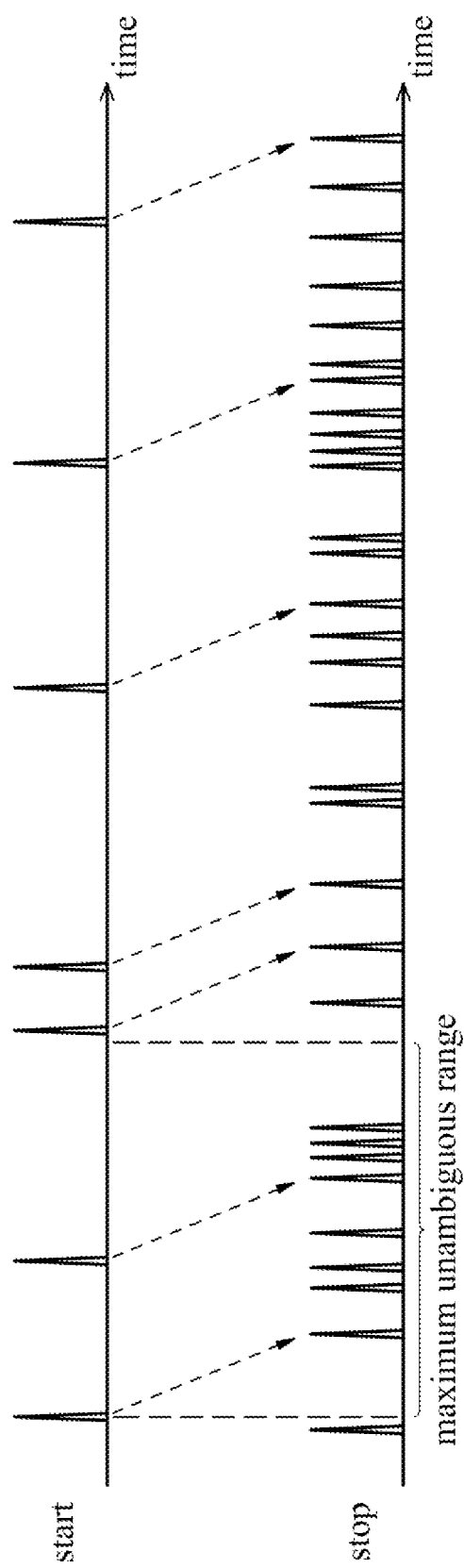
FIG. 1 shows a schematic diagram of how a LiDAR works by using an MSMS integration method to form a photon-count histogram according to the preferred embodiment of the present disclosure.

FIG. 1 is a schematic diagram showing how a LiDAR works by using an MSMS integration method to form a photon-count histogram according to the preferred embodiment of the present disclosure. In FIG. 1, how the MSMS integration method works is briefly described. A plurality of peaks in the first row indicate laser pulses emitted by the SPPM method (each laser pulse corresponds to a start point), the time and location of each laser pulse is decided randomly, and when the laser pulse is emitted, a start signal will be sent to the TDC (imaging the TDC as a stop watch). A plurality of peaks in the second row indicate photon detection events (each photon detection event corresponding to an end point) generated by the SPAD. The peaks pointed by the arrows represent detected photons really reflected from the target. The rest of the peaks in the second row represent photon detection events caused by external stray lights. Each photon detection event will send a stop signal to the TDC, the TDC will record a time period from the start to the stop (a time difference, imaging the TDC as a stopwatch), the two places respectively pointed by the arrowhead and the opposite end of the arrow at the second row and the first row respectively represent the corresponding relationship between the real reflected photon event and the emitted laser pulse.

For a conventional LiDAR, to avoid the ambiguity of ranging, the interval of the laser pulse has to be larger than a time that the laser spent for a round trip of a maximum unambiguous range. But by doing so, it will limit the amount of pulses capable of emitting within a unit time, and it will further limit the capability of fast ranging of LiDAR. The present disclosure sets up the SPPM method to break through the limitation. As shown in FIG. 1, there are two emitted pulses within the first maximum unambiguous range, and this will result in the ambiguity of ranging. But, the present disclosure proposes that such a self-interference in the photon-count histogram formed by the MSMS integration method just slightly raises the size of the noise, will not jeopardize the subsequent processing, and is a negligible price to pay when compared with the great benefit of significantly accelerated a time required to generate a photon-count histogram.

The working principles of the MSMS integration method are different from those of the prior arts, the start signal is not mainly used to record the photon events in a maximum unambiguous range, but the stop signal is mainly used to trace back to sequentially record all time differences between the stop signal and all the start signals located in the same maximum unambiguous range, and the photon events on the corresponding time values of the photon-count histogram are accumulated. All the correct photon detection events (such as the places pointed by the arrows in the second row of FIG. 1) will be accumulated on the correct corresponding times of the photon-count histogram. And, the self-interference events (for example, the time differences between the correct end points to the wrong start points are incorrect, and they will result in self-interferences) represent the photons at the wrong locations, together with the events caused by the stray lights, they will be randomly distributed at other times on the histogram.

Figure 2A:
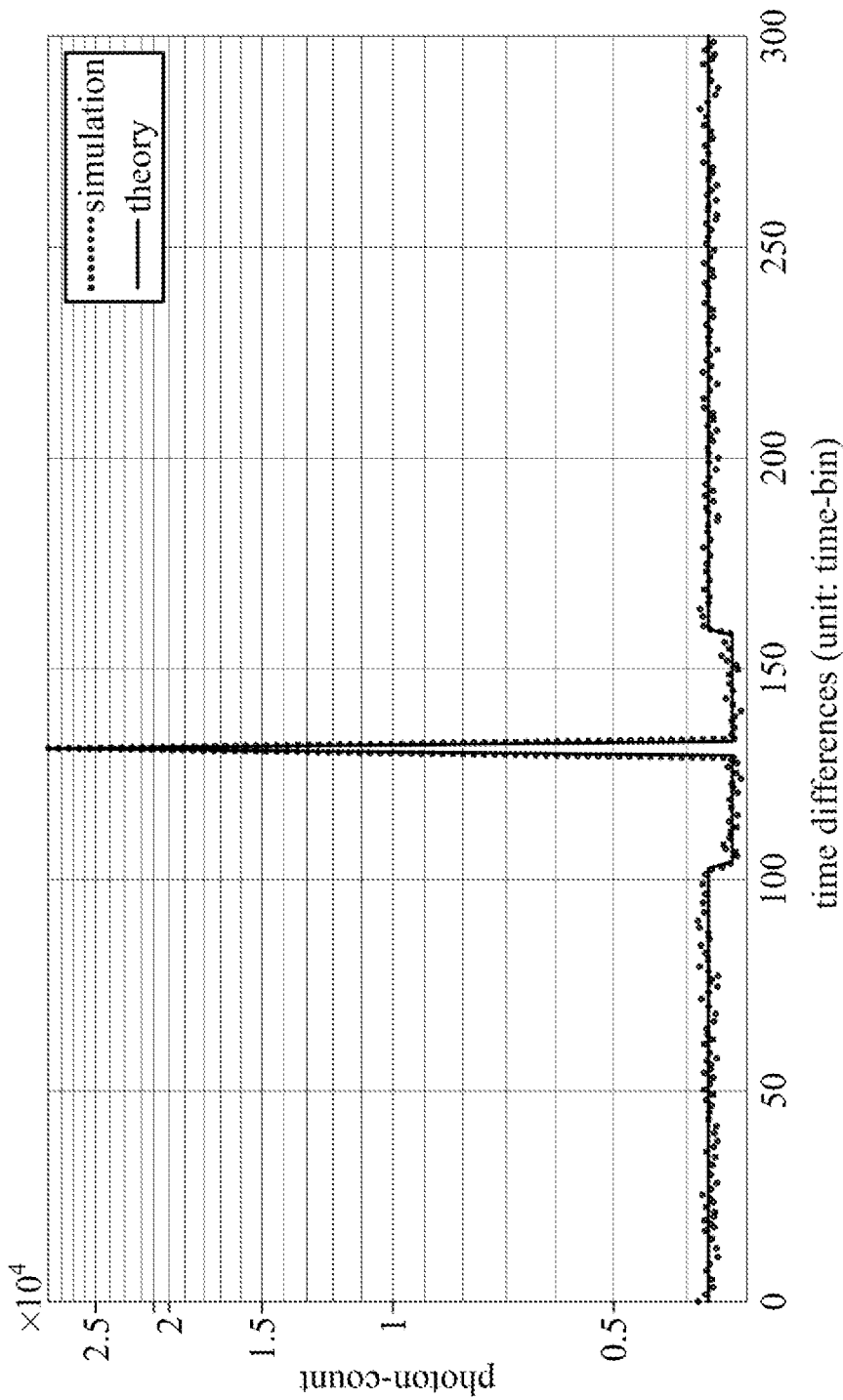
FIG. 2(a) shows a wave diagram of theory values and simulation values of a LiDAR using an MSMS integration method to form a photon-count histogram according to the preferred embodiment of the present disclosure.
Figure 2B:
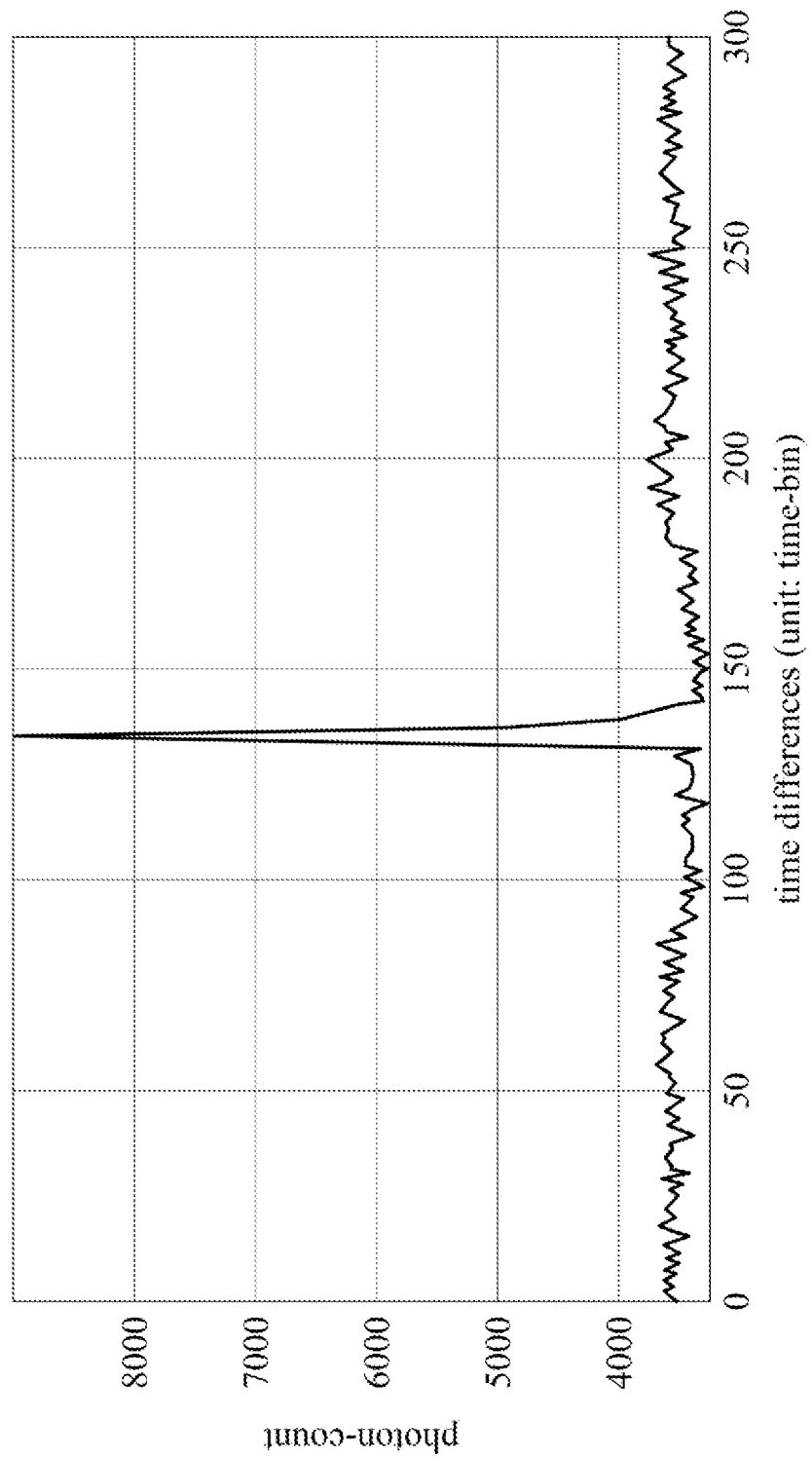
FIG. 2(b) shows a wave diagram of experimental values of a LiDAR using an MSMS integration method to form a photon-count histogram according to the preferred embodiment of the present disclosure.
Figure 5:
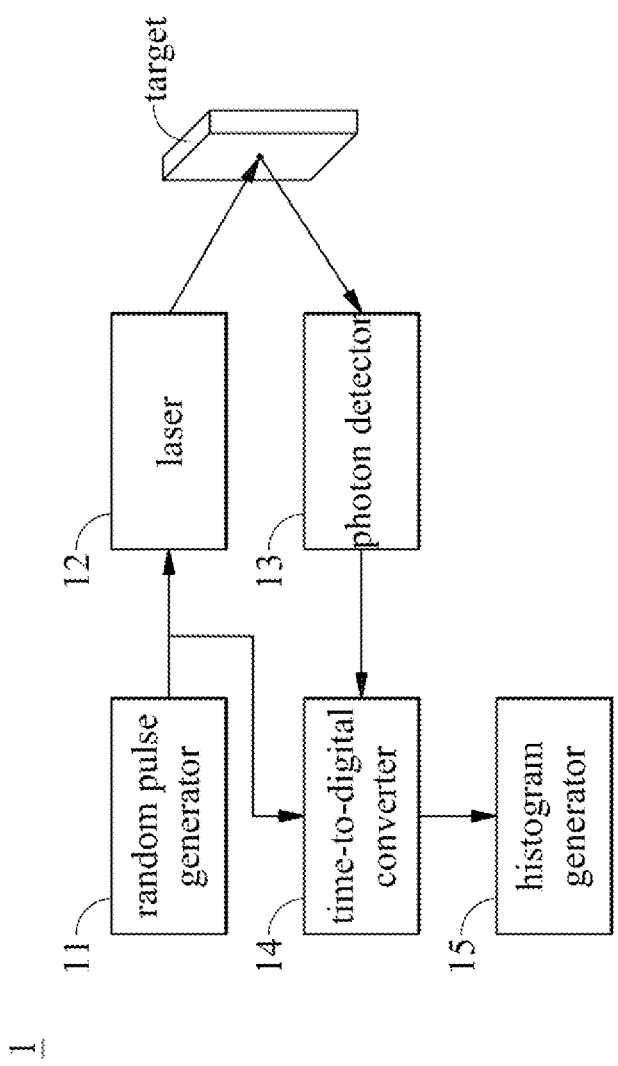
FIG. 5 shows a block diagram of a LiDAR according to the preferred embodiment of the present disclosure.

FIG. 2(a) is a wave diagram of theory values and simulation values of a LiDAR using an MSMS integration method to form a photon-count histogram according to the preferred embodiment of the present disclosure. FIG. 2(b) is a wave diagram of experimental values of a LiDAR using an MSMS integration method to form a photon-count histogram according to the preferred embodiment of the present disclosure. The experimental data of FIG. 2(b) is engaged according to the preferred embodiment (as shown in FIG. 5) of the framework of the present disclosure. In FIG. 2(a), we theoretically calculate the shape of the photon-count histogram (the solid line as shown in FIG. 2(a)), and verified by simulation (the dotted dashed lines as shown in FIG. 2(a)) and experiment (as shown in FIG. 2(b)). The peaks in FIGS. 2(a) and 2(b) represent the reflected lights of the real target, there are noises caused by the self-interferences and stray lights in the surroundings, and it can be seen that the theory accurately predicts the size of the noises. Notably, there is a small area around the peak has lower noise, and this is resulted in by the emission prohibited area allowed to be set up in the SPPM method. SPPM can set up a minimum interval between two laser pulses (it is different from the minimum pulse interval of ordinary LiDAR, and is not set up for avoiding the ambiguity of ranging). In this prohibited area, there will be no self-interference, and thus the amount of noise is decreased. The experimental data of FIG. 2b) verify the shape of the photon-count histogram (including the prohibited area) is basically correct.

FIG. 5 is a block diagram of a LiDAR according to the preferred embodiment of the present disclosure. In FIG. 5, the present disclosure proposes a LiDAR 1 includes a random pulse generator 11, a laser 12, a photon detector 13, a time-to-digital converter (TDC) 14 and a histogram generator 15. We engage in the above-mentioned experiment to verify the efficiency of fast photon-count integration of the method of the present disclosure, and the framework of the experimental configuration is shown in FIG. 5. In the experiment, the random pulse generator 11 on the left-hand side of FIG. 5 uses the SPPM mechanism to generate random triggering signals being transmitted to PDL 800-D laser driver circuit (not shown) to drive a 905 nm laser (the laser 12). In this experiment, an average density of the random triggering signals is set to 30 times of that of the conventional method. The reflected signals are received by SPAD (it is the photon detector 13). In this experiment, a time-correlated single-photon-counting instrument (TCSPC, its role and function are similar to TDC 14, not shown) is used to generate time stamps of photon detection events (Certainly, the TDC 14 may be used to replace the TCSPC, and similar results can be obtained also), and these signals are further transmitted to the histogram generator 15 (in the computer) to engage in the MSMS integration and to generate the photon-count histogram.

Figures 3A, 3B:
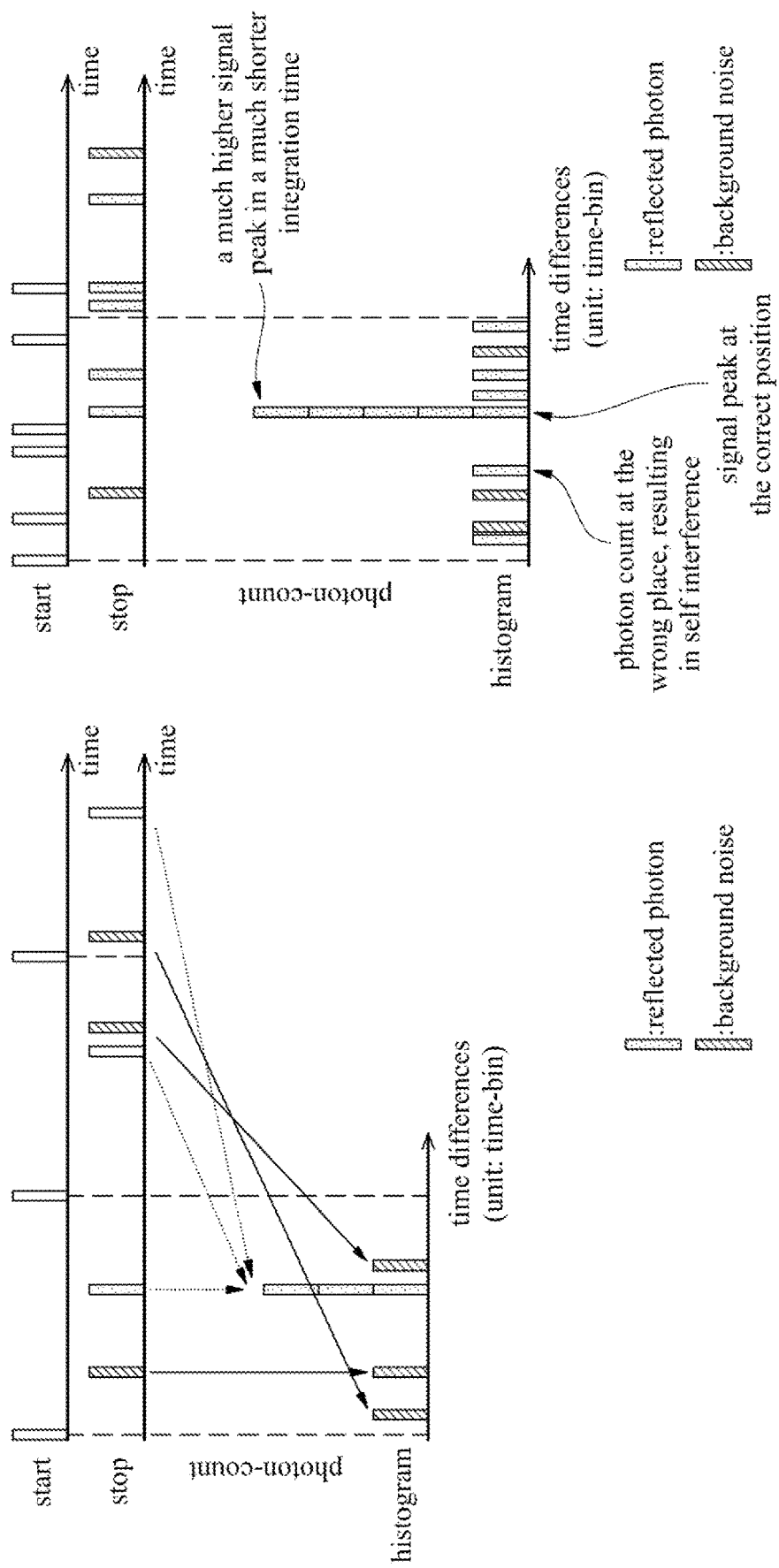
FIG. 3(a) shows a corresponding schematic diagram of start points of pulses and end points of pulses of a conventional LiDAR using a general interval of pulses to form a photon-count histogram, and its photon-count histogram.
FIG. 3(b) shows a corresponding schematic diagram of start points of pulses and end points of pulses of a LiDAR using an MSMS integration method having a relatively smaller interval of laser pulses to form a photon-count histogram, and its photon-count histogram according to the preferred embodiment of the present disclosure.
Figure 4:
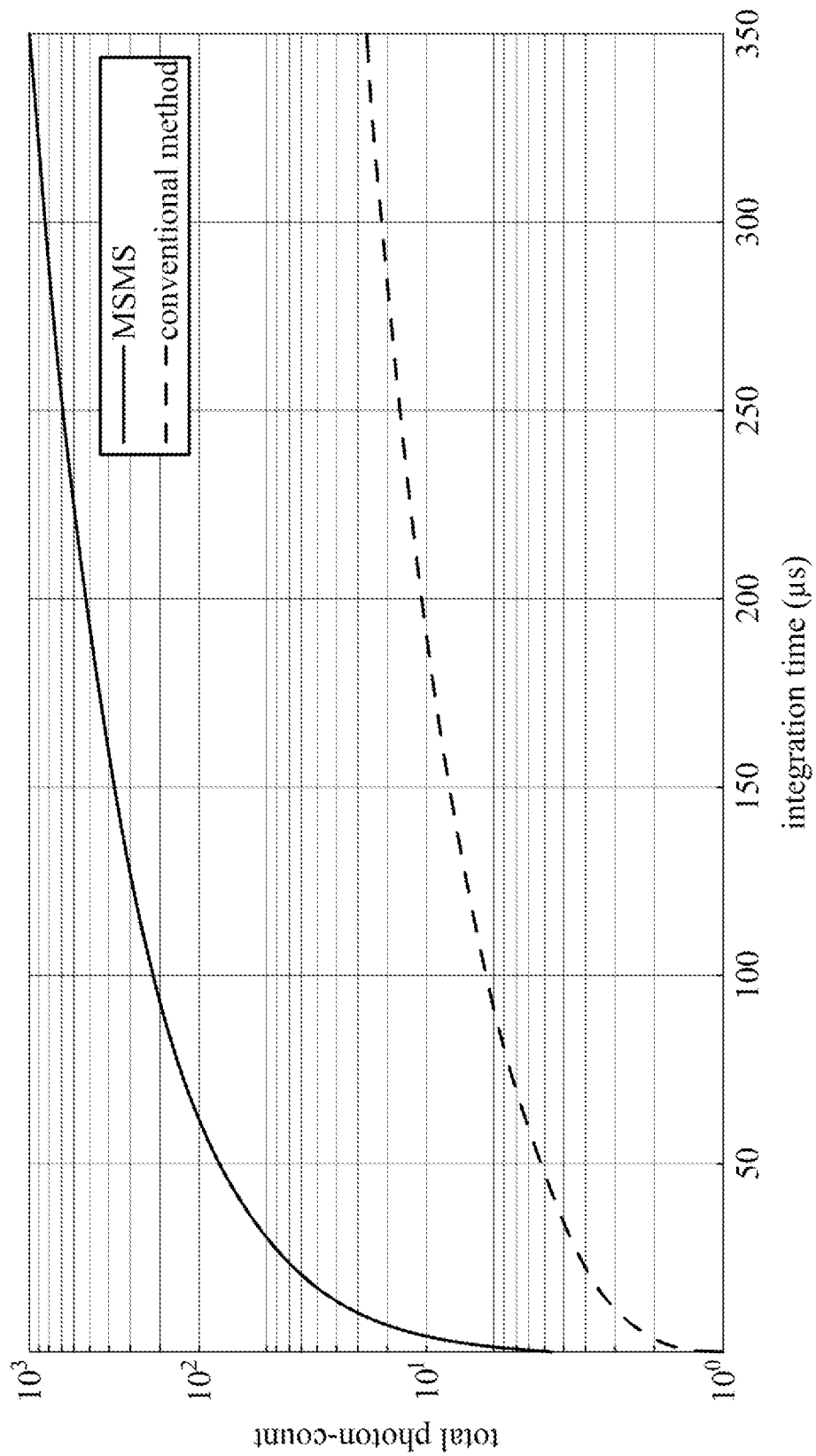
FIG. 4 shows a wave diagram of a total photon-count versus an integration time of experimental values of a LiDAR using an MSMS integration method to form a photon-count histogram according to the preferred embodiment of the present disclosure.

FIG. 3(a) shows a corresponding schematic diagram of start points of pulses and end points of pulses of a conventional LiDAR using a general interval of pulses to form a photon-count histogram, and its photon-count histogram. FIG. 3(b) shows a corresponding schematic diagram of start points of pulses and end points of pulses of a LiDAR using an MSMS integration method having a relatively smaller interval of laser pulses to form a photon-count histogram, and its photon-count histogram according to the preferred embodiment of the present disclosure. Comparing FIG. 3(a) with FIG. 3(b), it can be seen that the LiDAR 1 of the present disclosure (SPPM+MSMS) when compared with the conventional LiDAR (as shown in FIG. 3(a)), the LiDAR 1 proposed by the present disclosure can accumulate relatively higher photon-count peak values at the correct location with relatively shorter integration time. The LiDAR 1 of the present disclosure (SPPM+MSMS) has photon-counts at the wrong locations, and the photon-counts at the wrong locations result in self-interferences. However, the self-interference events together with the events caused by stray lights will be distributed randomly at other times of the photon-count histogram. The experimental results are shown in FIG. 4, which is a wave diagram of a total photon-count versus an integration time of experimental values of a LiDAR using an MSMS integration method to form a photon-count histogram according to the preferred embodiment of the present disclosure. In FIG. 4, the horizontal axis is the integration time, and the vertical axis is the total photon-count accumulated. Comparing the total photon-count accumulated of the SPPM laser pulses going with the MSMS integration method (solid line) with that of the conventional method (dotted dashed line), it can be seen that the total photon-count of the method proposed by the present disclosure is obviously higher than that obtained by the conventional method, and comparing the integration time of the same photon-count of the two, that of the method proposed by the present disclosure speeds up almost 30 times than that of the conventional method, and it is close to the estimated value of the present disclosure. This estimated value is because the average number of the emitted random laser pulses in the above-mentioned experiment is 30 times than that of the conventional method, thus the integration time of photon-count will be correspondingly decreased by 30 times. That is to say, the times of the emission density is equal to the times of the subtracted time ideally.

The present disclosure proposes a method of a fast photon-count integration for a LiDAR 1, wherein the LiDAR 1 includes a laser 12, a photon detector 13, a time-to-digital converter 14, a histogram generator 15 and a random pulse generator 11, comprising: providing a target and the LiDAR 1; causing the random pulse generator 11 to generate a plurality of random triggering signals according to a random mechanism included therein so as to cause the laser 12 to generate a plurality of random laser pulses accordingly, wherein each random laser pulse corresponds to a start point; receiving a plurality of photons by the photon detector 13 to generate a plurality of photon detection events, wherein at least a portion of the plurality of photons is generated from reflecting the plurality of random laser pulses by the target; using the time-to-digital converter 14 to calibrate a time of each photon detection event, wherein each photon detection event corresponds to an end point; defining a plurality of unit times covered by the plurality of photon detection events so that each end point is in a specific one of the plurality of unit times; and causing the histogram generator 15 to use a Multi-Start Multi-Stop (MSMS) integration method to sequentially record in reverse order each time difference between a respective end point and a respective start point located in the specific unit time corresponding to the respective end point so as to generate a photon-count histogram according to all the time differences for all the end points, and to obtain a detection and a ranging of the target according to a peak value of the photon-count histogram (referring to FIG. 1, FIG. 2(a), FIG. 2(b), FIG. 3(b), FIG. 4 and FIG. 5).

In the above-mentioned method, wherein the random mechanism includes one of a true random mechanism and a pseudo random mechanism, and the MSMS integration causing method step further includes: causing the histogram generator 15 to be coupled to the time-to-digital converter 14; after the time of each photon detection event is calibrated, using the MSMS integration method, in each one of the plurality of unit times, to trace back to sequentially record all time differences between a first time point of a respective stop signal transmitted to the time-to-digital converter 14 when a respective photon detection event is generated and each of second time points of start signals transmitted to the time-to-digital converter 14 when respective ones of the plurality of random laser pulses in the specific unit time corresponding to the first time point are emitted, wherein each unit time is a time that the laser spent for a round trip of a maximum unambiguous range, the first time point is the respective end point, and the second time point is the respective start point; and in the histogram, for each time difference recorded, causing a photon number corresponding thereto to be increased by one.

In the above-mentioned method, wherein the random pulse generator 11 generates the plurality of random triggering signals according to the true random mechanism included therein, and the true random mechanism is implemented according to a Stochastic Pulse Position Modulation (SPPM) method to modulate a density of the plurality of random triggering signals such that the plurality of random laser pulses are emitted intensively in the plurality of unit times, while in the meantime, a time and a location of each random laser pulse are determined randomly, and a specific location having a maximum photon number in the histogram is the location of the target.

The present disclosure further proposes a method of a fast photon-count integration for a LiDAR 1, wherein the LiDAR 1 includes a laser 12, comprising: providing a target and the laser 12; causing the laser 12 to emit a plurality of laser pulses towards the target according to a random mechanism; causing an interval between two adjacent laser pulses to be less than a time that the laser 12 spent for a round trip of a maximum unambiguous range such that the LiDAR 1 will speed up a detection and a ranging towards the target; receiving a plurality of photons through a photon detector 13 so as to generate a plurality of photon detection events, wherein each photon detection event corresponds to an end point; defining a plurality of unit times covering the plurality of photon detection events so that each end point corresponds to a specific unit time of the plurality of unit times; and using a Multi-Start Multi-Stop (MSMS) integration method to sequentially record in reverse order all time differences between each end point and each start point located in the specific unit time corresponding to the end point so as to generate a photon-count histogram according to the all time differences, and to obtain the detection and the ranging according to a peak value of a photon number of the photon-count histogram (referring to FIG. 1, FIG. 2(*a*), FIG. 2(*b*), FIG. 3(*b*), FIG. 4 and FIG. 5).

In the above-mentioned method, wherein the LiDAR includes the photon detector 13, a time-to-digital converter 14, a histogram generator 15 and a random pulse generator 11; the random mechanism includes one of a true random mechanism and a pseudo random mechanism; the causing the laser to emit step includes causing the random pulse generator 11 to generate a plurality of random triggering signals according to one of a true random mechanism and a pseudo random mechanism included therein, and causing the laser 12 to receive the plurality of random triggering signals so as to generate the plurality of laser pulses accordingly; the interval causing step includes setting two adjacent laser pulses to have a minimum interval therebetween and an emitting prohibited area within the minimum interval so as to eliminate a possibly generated self-interference within the minimum interval; and the method further comprises causing the time-to-digital converter 14 to be coupled to the photon detector 13 and to calibrate a time of each photon detection event, and causing the histogram generator 15 to be coupled to the time-to-digital converter 14 so as to generate the photon-count histogram.

In the above-mentioned fast photon-count integration method, wherein the step of causing the time-to-digital converter 14 to be coupled to the photon detector 13 comprises: after the time of each photon detection event has been calibrated, using the MSMS integration method, in each one of the plurality of unit times, to trace back to sequentially record all time differences between a first time point of a respective stop signal transmitted to the time-to-digital converter 14 when a respective photon detection event is generated and each of second time points of respective start signals transmitted to the time-to-digital converter 14 when respective ones of the plurality of laser pulses in the specific unit time corresponding to the first time point are emitted; and in the photon-count histogram, for each time difference recorded, causing a corresponding photon number to be increased by one, wherein a specific location having a maximum photon number in the photon-count histogram is the location of the target.

The present disclosure further proposes a LiDAR 1 comprising a random pulse generator 11 generating a plurality of random triggering signals according to a random mechanism included therein, a laser 12 receiving the plurality of random triggering signals so as to generate a plurality of laser pulses accordingly, wherein each random laser pulse corresponds to a start point, a photon detector 13 receiving a plurality of photons to generate a plurality of photon detection events, wherein at least a portion of the plurality of photons is generated from reflecting the plurality of laser pulses by an external target, a time-to-digital converter 14 coupled to the photon detector 13 and used to calibrate a time of each photon detection event, wherein each photon detection event corresponds to an end point, and a histogram generator 15 coupled to the time-to-digital converter 14, defining a plurality of unit times covering the plurality of photon detection events so that each end point corresponds to a specific one of the plurality of unit times, using a Multi-Start Multi-Stop (MSMS) integration method, to sequentially record in reverse order all time differences between each end point and each of start points located in the specific unit time corresponding to the end point, and generating a photon-count histogram according to the all time differences for all the end points such that the LiDAR accomplishes a detection and a ranging towards the target accordingly (referring to FIG. 1, FIG. 2(*a*), FIG. 2(*b*), FIG. 3(*b*), FIG. 4 and FIG. 5).

In the above-mentioned LiDAR 1, wherein the random mechanism is one of a true random mechanism and a pseudo random mechanism, after the time of each photon detection event is calibrated, using the MSMS integration method, to trace back sequentially in each of the plurality of unit times, all time differences between a first time point of a respective stop signal transmitted to the time-to-digital converter 14 when the respective photon detection event is generated and each of second time points of respective start signals transmitted to the time-to-digital converter 14 when respective ones of the plurality of laser pulses in the specific unit time corresponding to the first time point are emitted, wherein each of the unit times is a time that the laser 12 spent for a round trip of a maximum unambiguous range, the first time point is the end point, the respective second time point is the start point, and in the photon-count histogram, for each the time difference recorded, a corresponding photon number is caused to be increased by one.

In the above-mentioned LiDAR 1, wherein the random pulse generator 11 generates the plurality of random triggering signals according to the true random mechanism included therein, and the true random mechanism is implemented according to a Stochastic Pulse Position Modulation (SPPM) method to modulate a density of the plurality of random triggering signals such that the plurality of laser pulses are emitted intensively in the plurality of unit times, while in the meantime, a time and a location of each laser pulse are determined randomly, and a specific location having a maximum photon number in the photon-count histogram is the location of the target.

The present disclosure further proposes a method of a fast photon-count integration for a LiDAR 1, wherein the LiDAR 1 includes a laser 12, comprising: providing a target and the laser 12; causing the laser 12 to emit a plurality of laser pulses towards the target according to a random mechanism; and causing an interval between two adjacent laser pulses to be less than a time that the laser 12 spent for a round trip of a maximum unambiguous range such that the LiDAR will speed up a detection and a ranging towards the target (referring to FIG. 1, FIG. 2(a), FIG. 2(b), FIG. 3(b), FIG. 4 and FIG. 5).

In conclusion, the present disclosure provides a LiDAR and a method of fast photon-count integration for LiDAR to significantly speed up a speed of accumulating enough received photons and decrease the time of accumulating enough received photons so as to achieve the purpose of fast target detection and ranging, which is both non-obvious and novel.

While the invention has been described in terms of what is presently considered to be the most practical and preferred embodiments, it is to be understood that the invention need not be limited to the disclosed embodiments. Therefore, it is intended to cover various modifications and similar configurations included within the spirit and scope of the appended claims, which are to be accorded with the broadest interpretation so as to encompass all such modifications and similar structures.

We claim:

1. A method of a fast photon-count integration for a LiDAR, wherein the LiDAR comprises a laser, a photon detector, a time-to-digital converter, a histogram generator and a random pulse generator, comprising:
    providing a target and the LiDAR;
    causing the random pulse generator to generate a plurality of random triggering signals according to a random mechanism included therein so as to cause the laser to generate a plurality of random laser pulses accordingly, wherein each random laser pulse corresponds to a start point;
    receiving a plurality of photons by the photon detector to generate a plurality of photon detection events, wherein at least a portion of the plurality of photons is generated from reflecting the plurality of random laser pulses by the target;
    using the time-to-digital converter to calibrate a time of each photon detection event, wherein each photon detection event corresponds to an end point;
    defining a plurality of unit times covered by the plurality of photon detection events so that each end point is in a specific one of the plurality of unit times; and
    causing the histogram generator to use a Multi-Start Multi-Stop (MSMS) integration method to sequentially record in reverse order each time difference between a respective end point and a respective start point located in the specific unit time corresponding to the respective end point so as to generate a photon-count histogram according to all the time differences for all the end points, and to obtain a detection and a ranging of the target according to a peak value of the photon-count histogram.

2. The method according to claim 1, wherein the random mechanism includes one of a true random mechanism and a pseudo random mechanism, and the MSMS integration causing method step further includes:
    causing the histogram generator to be coupled to the time-to-digital converter;
    after the time of each photon detection event is calibrated, using the MSMS integration method, in each one of the plurality of unit times, to trace back to sequentially record all time differences between a first time point of a respective stop signal transmitted to the time-to-digital converter when a respective photon detection event is generated and each of second time points of start signals transmitted to the time-to-digital converter when respective ones of the plurality of random laser pulses in the specific unit time corresponding to the first time point are emitted, wherein each unit time is a time that the laser spent for a round trip of a maximum unambiguous range, the first time point is the respective end point, and the second time point is the respective start point; and
    in the histogram, for each time difference recorded, causing a photon number corresponding thereto to be increased by one.

3. The method according to claim 2, wherein the random pulse generator generates the plurality of random triggering signals according to the true random mechanism included therein, and the true random mechanism is implemented according to a Stochastic Pulse Position Modulation (SPPM) method to modulate a density of the plurality of random triggering signals such that the plurality of random laser pulses are emitted intensively in the plurality of unit times, while in the meantime, a time and a location of each random laser pulse are determined randomly, and a specific location having a maximum photon number in the histogram is the location of the target.

4. A method of a fast photon-count integration for a LiDAR, wherein the LiDAR includes a laser, comprising: providing a target and the laser; causing the laser to emit a plurality of laser pulses towards the target according to a random mechanism; and causing an interval between two adjacent laser pulses to be less than a time that the laser spent for a round trip of a maximum unambiguous range such that the LiDAR will speed up a detection and a ranging towards the target wherein the interval is an emission interval, each laser pulse corresponds to a start point, and the method further comprises: receiving a plurality of photons through a photon detector so as to generate a plurality of photon detection events, wherein each photon detection event corresponds to an end point; defining a plurality of unit times covering the plurality of photon detection events so that each end point corresponds to a specific unit time of the plurality of unit times; and using a Multi-Start Multi-Stop (MSMS) integration method to sequentially record in reverse order all time differences between each endpoint and each start point located in the specific unit time corresponding to the end point so as to generate a photon-count histogram according to the all-time differences, and to obtain the detection and the ranging according to a peak value of a photon number of the photon-count histogram.

5. The method according to claim 1, wherein: the LiDAR includes the photon detector, a time-to-digital converter, a histogram generator and a random pulse generator; the random mechanism includes one of a true random mechanism and a pseudo random mechanism; the causing the laser to emit step includes causing the random pulse generator to generate a plurality of random triggering signals according to one of a true random mechanism and a pseudo random mechanism included therein, and causing the laser to receive the plurality of random triggering signals so as to generate the plurality of laser pulses accordingly; the interval causing step includes setting two adjacent laser pulses to have a minimum interval therebetween and an emitting prohibited area within the minimum interval so as to eliminate a possibly generated self-interference within the minimum interval; and the method further comprises causing the time-to-digital converter to be coupled to the photon detector and to calibrate a time of each photon detection event, and causing the histogram generator to be coupled to the time-to-digital converter so as to generate the photon-count histogram.

6. The method according to claim 5, wherein the step of causing the time-to-digital converter to be coupled to the photon detector comprises:

after the time of each photon detection event has been calibrated, using the MSMS integration method, in each one of the plurality of unit times, to trace back to sequentially record all time differences between a first time point of a respective stop signal transmitted to the time-to-digital converter when a respective photon detection event is generated and each of second time points of respective start signals transmitted to the time-to-digital converter when respective ones of the plurality of laser pulses in the specific unit time corresponding to the first time point are emitted; and in the photon-count histogram, for each time difference recorded, causing a corresponding photon number to be increased by one, wherein a specific location having a maximum photon number in the photon-count histogram is the location of the target.

7. A LiDAR, comprising:

a random pulse generator generating a plurality of random triggering signals according to a random mechanism included therein;

a laser receiving the plurality of random triggering signals so as to generate a plurality of laser pulses accordingly, wherein each random laser pulse corresponds to a start point;

a photon detector receiving a plurality of photons to generate a plurality of photon detection events, wherein at least a portion of the plurality of photons is generated from reflecting the plurality of laser pulses by an external target;

a time-to-digital converter coupled to the photon detector and used to calibrate a time of each photon detection event, wherein each photon detection event corresponds to an end point; and a histogram generator coupled to the time-to-digital converter, defining a plurality of unit times covering the plurality of photon detection events so that each end point corresponds to a specific one of the plurality of unit times, using a Multi-Start Multi-Stop (MSMS) integration method, to sequentially record in reverse order all time differences between each end point and each of start points located in the specific unit time corresponding to the end point, and generating a photon-count histogram according to the all time differences for all the end points such that the LiDAR accomplishes a detection and a ranging towards the target accordingly.

8. The LiDAR according to claim 7, wherein the random mechanism is one of a true random mechanism and a pseudo random mechanism, after the time of each photon detection event is calibrated, using the MSMS integration method, to trace back sequentially in each of the plurality of unit times, all time differences between a first time point of a respective stop signal transmitted to the time-to-digital converter when the respective photon detection event is generated and each of second time points of respective start signals transmitted to the time-to-digital converter when respective ones of the plurality of laser pulses in the specific unit time corresponding to the first time point are emitted, wherein each of the unit times is a time that the laser spent for a round trip of a maximum unambiguous range, the first time point is the end point, the respective second time point is the start point, and in the photon-count histogram, for each the time difference recorded, a corresponding photon number is caused to be increased by one.

9. The LiDAR according to claim 8, wherein the random pulse generator generates the plurality of random triggering signals according to the true random mechanism included therein, and the true random mechanism is implemented according to a Stochastic Pulse Position Modulation (SPPM) method to modulate a density of the plurality of random triggering signals such that the plurality of laser pulses are emitted intensively in the plurality of unit times, while in the meantime, a time and a location of each laser pulse are determined randomly, and a specific location having a maximum photon number in the photon-count histogram is the location of the target.

* * * * *